Aug. 21, 1923. 1,465,866
D. I. RENDLICH
CARCASS CUTTING DEVICE
Filed April 23, 1923
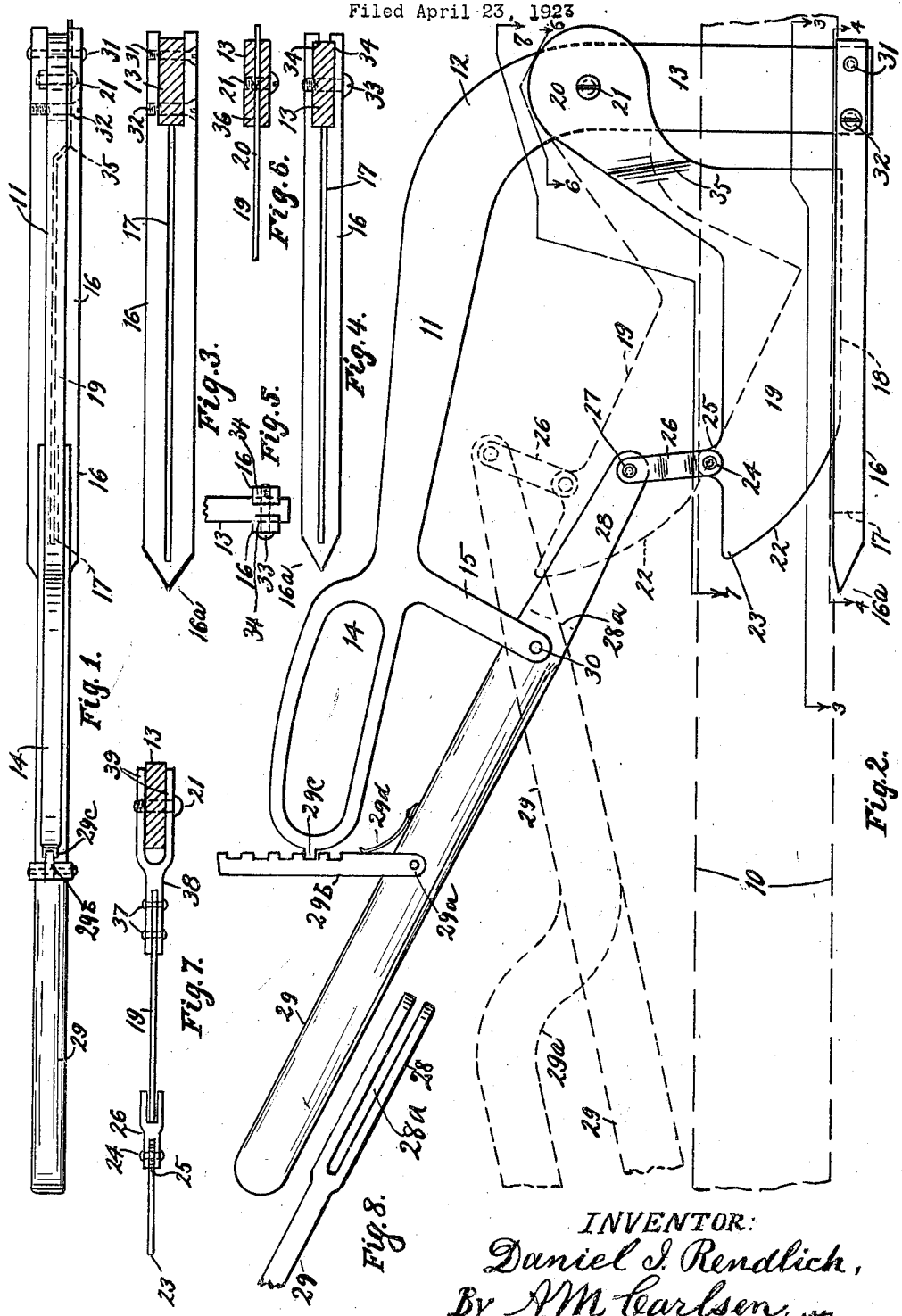
INVENTOR:
Daniel I. Rendlich,
By A. M. Carlsen, Attorney.

Patented Aug. 21, 1923.

1,465,866

UNITED STATES PATENT OFFICE.

DANIEL I. RENDLICH, OF SOUTH ST. PAUL, MINNESOTA.

CARCASS-CUTTING DEVICE.

Application filed April 23, 1923. Serial No. 633,835.

*To all whom it may concern:*

Be it known that I, DANIEL I. RENDLICH, a citizen of the United States, residing at South St. Paul, in the county of Dakota and State of Minnesota, have invented certain new and useful Improvements in Carcass-Cutting Devices, of which the following is a specification.

My invention relates to devices used in slaughter houses for opening the bodies of hogs, calves and other small animals preparatory to removing the insides therefrom and the object is to provide an improved, efficient device of said kind.

In the accompanying drawing:

Fig. 1 is a top view of the improved device.

Fig. 2 is a side view of Fig. 1, with the mechanism shown in two positions one of which is in dotted lines.

Fig. 3 is a section on line 3—3 in Fig. 2 with the cutting blade omitted.

Fig. 4 is a section on line 4—4 in Fig. 2 but modified.

Fig. 5 is a right hand end view of Fig. 4.

Fig. 6 is a section on line 6—6 in Fig. 2.

Fig. 7 is a section on line 7—7 in Fig. 2 with the link 26 detached from the operating lever and folded over to the right, and the attaching of the cutter blade to the frame modified. Fig. 8 is a top view of lever arm 28.

Referring to the drawing by reference numerals, the space between the lines 10 in Fig. 2 indicates the thickest part of the front of the carcass to be cut open, and the device shown in operation in said view is drawn on a scale corresponding to such thickness. (The actual thickness at the breastbone of hogs and small cattle is not supposed to exceed two and one-half inches, and hence my drawing is practically one-half of full size.)

11 is a main body piece of the device curved at 12 to form a leg 13 and has its upper end formed with an eye-shaped handle or hand hold 14 and adjacent thereto a small arm 15. Suitably secured to the leg 13 at about right angles there is a long finger 16 having a slit 17 extending from the leg 13 and almost to its point $16^a$, which is sharp as shown. Said slit serves as a clearance for the sharp edge 18 of a steel blade 19 which has at one end a suitable extension 20 pivoted at 21 to the leg 13. The other end of the blade has its edge curved at 22 to form a point 23. The blade is near its back provided with a hole 24, preferably in a lug 25 which serves to bring the end of a link 26 above the blade to leave the latter free to cut fully into the flesh. Said link 26 has its upper end pivoted at 27 to the short arm 28 of a hand lever 28—29 which is fulcrumed at 30 to the arm 15. The arm 28 may have a slit $28^a$ for the blade.

In Fig. 2 is shown at $29^a$ that the hand lever 29 may be offset so as to more fully clear the surface of the carcass 10 operated on.

Pivoted at $29^a$ is a rack $29^b$ adapted to engage a tooth $29^c$ on the handle 14. $29^d$ is a spring holding the rack normally disengaged.

The leg 13 is preferably secured to the finger 16 in such a manner that the finger may readily be displaced while the blade 19 is being sharpened. Such displacement I may provide for in several ways; thus in Figs. 1, 2 and 3 I have shown a pivot 31 and a screw 32. By removing said screw the finger may be swung on the pivot out of the way for a grinding device. In Figs. 4 and 5 only one screw 33 is used and the finger 16 has its rear end formed with inward notches 34 in which the leg 13 is held against swinging on the screw 33, except when the screw is partly unscrewed, when the notched parts may be sprung apart and permit the finger to be swung out of the way for grinding of the blade.

In Fig. 1 the blade is shown as being offset at 35 to bring it into plane with the slit 17 in the finger and the blade is pivoted to the side of the piece 12—13. But this is so modified in Fig. 6 that the blade is fitted and pivoted in a slot 36 in the piece 12—13. In Fig. 7 the blade is secured by rivets or like means 37 in one end of a special piece 38 having a fork 39 swingable on or with the screw 21.

In Fig. 7 is also shown that the link 26 may have one or both ends forked but it is obvious that two parallel links or even one link will also serve the purpose. I therefore do not wish or mean to limit the invention to any of such minor variations.

In the operation of the device the carcass to be gutted is usually suspended by the hind legs from a carriage having wheels rolling on a rail or rails, each carcass having been previously cut or given a so-called "sticking hole" in front of the collar bone.

To cut the carcass open the operator of my device inserts the finger 16 into said sticking hole as far as it will go when blade 19 is spread away from the finger.

With one hand on handle 14 and the other on lever 29 the operator now pulls the device as from head to tail of the carcass while repeatedly swinging the lever 29 toward and away from handle 14. This, of course, operates the blade 19 and cuts the carcass open in a very short time as compared with the use of devices heretofore used.

The point 16ª of the finger is sharp enough to be readily forced through the diafragm of the carcass. In cutting open the belly portion no shearing movement may be necessary, the operator merely holds the rack engaged with the tooth 29ᶜ so as to keep the blade open to the desired degree while he pulls the device along and rips the belly open.

What I claim is:

1. In a device of the class described, a curved body piece forming a long arm with a handle thereon and a short arm or leg, a finger secured to the end of said leg and extending in plane with the arm having the handle, a cutter blade having one end pivotally connected with the leg and having a sharp edge directed toward the finger, a hand lever fulcrumed to a projection of the arm having the handle, and having a short arm connected by a link to the blade, and a long arm extending beyond the first mentioned handle.

2. The structure specified in claim 1, in which the finger in front of the edge of the blade has a clearance for said edge.

3. The structure specified in claim 1, in which the said finger has a longitudinal slit in plane with the edge of the cutting blade.

4. The structure specified in claim 1, in which said finger is arranged to be readily set free enough from the leg to be swung out of the way when the blade is to be ground or sharpened.

5. The structure specified in claim 1, in which the blade has a projecting lug opposite from its edge and pivoted to the link.

6. The structure specified in claim 1, said short arm having longitudinal slit as a clearance for the blade.

7. The structure specified in claim 1, and means for locking the blade in any desired degree of open position.

8. The structure specified in claim 7, said locking means comprising a rack pivoted with one end to the blade-operating lever and a tooth on the body piece formed with a handle, arranged to engage between the teeth of the rack when so desired.

9. The structure specified in claim 8 and a spring tending to hold the rack normally disengaged.

10. In a device of the kind described, a frame having a handle at one end and at the other end a sharp pointed finger with a longitudinal clearance for the sharp edge of a blade, a sharp-edged blade pivotally connected with one end of the frame, to swing toward and away from the finger, a hand lever fulcrumed on the frame and pivotally connected with the blade so near its free end as to form with the blade a compound lever for forcing the edge of the blade through bony parts of the carcass operated on.

In testimony whereof I affix my signature.

DANIEL I. RENDLICH.